US010241802B2

(12) United States Patent
Lancaster et al.

(10) Patent No.: US 10,241,802 B2
(45) Date of Patent: *Mar. 26, 2019

(54) PARALLEL PROCESSOR WITH SINGLE INSTRUCTION MULTIPLE DATA (SIMD) CONTROLLERS

(71) Applicant: TELEFONAKTIEBOLAGET L M ERICSSON (PUBL), Stockholm (SE)

(72) Inventors: John Lancaster, High Wycombe (GB); Martin Whitaker, High Wycombe (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 382 days.

This patent is subject to a terminal disclaimer.

(21) Appl. No.: 14/947,573

(22) Filed: Nov. 20, 2015

(65) Prior Publication Data

US 2016/0077838 A1    Mar. 17, 2016

Related U.S. Application Data

(63) Continuation of application No. 12/993,793, filed as application No. PCT/GB2009/050546 on May 20, 2009, now Pat. No. 9,195,467.

(30) Foreign Application Priority Data

May 20, 2008 (GB) .................................. 0809189.4

(51) Int. Cl.
*G06F 9/38* (2018.01)
*G06F 15/80* (2006.01)
*G06F 9/30* (2018.01)

(52) U.S. Cl.
CPC .......... *G06F 9/3887* (2013.01); *G06F 9/3016* (2013.01); *G06F 9/3889* (2013.01); *G06F 9/3891* (2013.01); *G06F 15/8007* (2013.01)

(58) Field of Classification Search
CPC ... G06F 9/3887; G06F 9/3891; G06F 15/8007
(Continued)

(56) References Cited

U.S. PATENT DOCUMENTS 6,487,651 B1    11/2002  Jackson et al.
2008/0059771 A1  3/2008  Svendsen et al.
(Continued)

OTHER PUBLICATIONS

Nutt, Gary J.: "Microprocessor Implementation of a Parallel Processor". Department of Computer Science, University of Colorado. Jul. 1976.
(Continued)

*Primary Examiner* — Jacob Petranek (57) ABSTRACT

A parallel processor for processing a plurality of different processing instruction streams in parallel is described. The processor comprises a plurality of data processing units; and a plurality of SIMD (Single Instruction Multiple Data) controllers, each connectable to a group of data processing units of the plurality of data processing units, and each SIMD controller arranged to handle an individual processing task with a subgroup of actively connected data processing units selected from the group of data processing units. The parallel processor is arranged to vary dynamically the size of the subgroup of data processing units to which each SIMD controller is actively connected under control of received processing instruction streams, thereby permitting each SIMD controller to be actively connected to a different number of processing units for different processing tasks.

15 Claims, 7 Drawing Sheets

(58) Field of Classification Search
USPC .......................................................... 712/22
See application file for complete search history.

(56) References Cited

U.S. PATENT DOCUMENTS

| | | |
|---|---|---|
| 2008/0189347 A1 | 8/2008 | Aldrich et al. |
| 2008/0209164 A1 | 8/2008 | Wildman |
| 2009/0144523 A1 | 6/2009 | Lyuh et al. |
| 2010/0100706 A1 | 4/2010 | Inoue et al. |

OTHER PUBLICATIONS

Ma, et al.: "The Architecture of Replica—A Special-Purpose Computer System for Active Multi-Sensory Perception of 3-Dimensional Objects". 1984.

Bridges, Timothy: "The GPA Machine: A Generally Partitionable MSIMD Architecture." 1990.

Wang, Hong; Walker, Robert A. "Implementing a Scalable ASC Processor" Proceedings of the International Parallel and Distributed Processing Symposium (IPDPS'03), IEEE 2003.

PARALLEL PROCESSOR WITH SINGLE INSTRUCTION MULTIPLE DATA (SIMD) CONTROLLERS

CLAIM OF PRIORITY

This application is a continuation of U.S. patent application Ser. No. 12/993,793, filed on Apr. 13, 2011, now U.S. Pat. No. 9,195,467, issued Nov. 24, 2015, which is a U.S. National Application filed under 35 U.S.C. 371 based on International Application No. PCT/GB09/50546, filed on May 20, 2009, which further claims priority to UK Application No. GB 0809189.4, filed May 20, 2008. The contents of these documents are hereby incorporated by reference herein.

FIELD OF INVENTION

This invention relates to SIMD architecture for a high-performance, flexible, scalable processor and more specifically to SIMD controllers used within non-associative data processing architectures. The present invention is concerned with configuring a plurality of SIMD controllers to operate in a manner which enables them to perform Multiple Instruction stream, Multiple Data stream (MMD) tasks. An example of a SIMD controller with an associative architecture is provided in International Patent Publication No. WO03/054707.

DISCUSSION OF PRIOR ART

Figure 1:
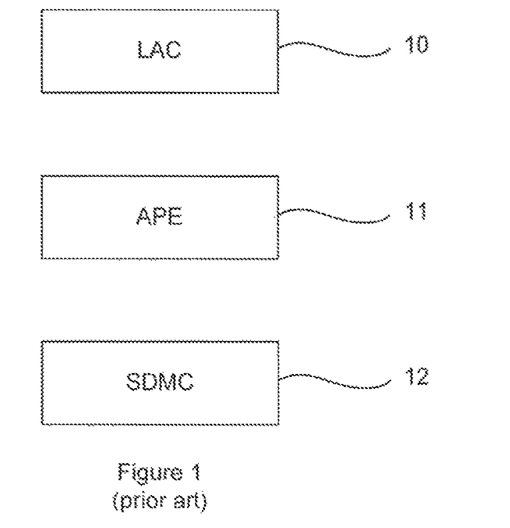
FIG. 1 illustrates SIMD processing architecture according to the prior art.
Figure 2:
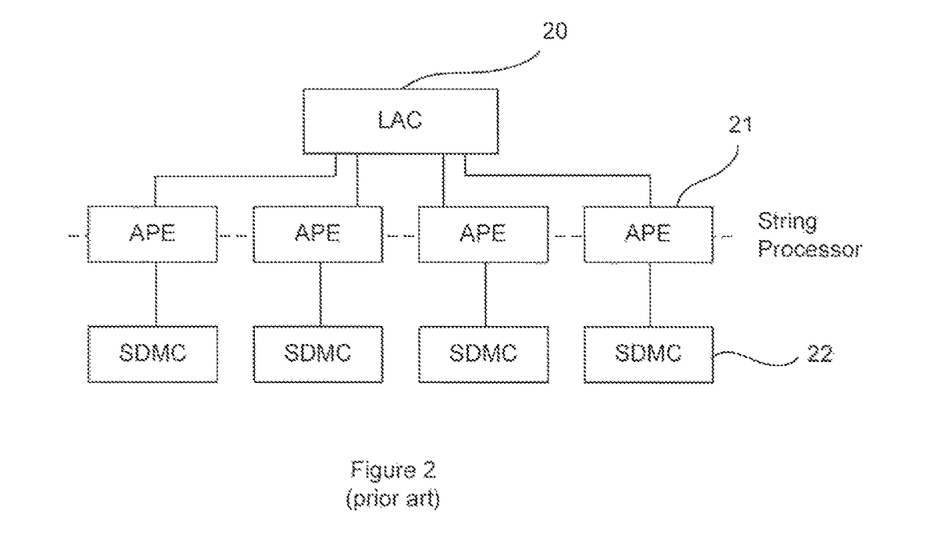
FIG. 2 illustrates another SIMD processing architecture according to the prior art.

The present applicant has previously developed parallel processing architectures using Associative String Processors (ASP). These array processors are described for example in European patent EP0983556B and basically comprise a controller or LAC 10 (Low-level Associative string processor Controller), a string of Associative Processing Elements (APEs) 11 and secondary data movement controllers (SDMC) 12. The general arrangement in terms of hierarchy is shown in FIG. 1. This organisational structure is used in a SIMD array processor architecture, called Linedancer™ HD. FIG. 2 shows how the above-described elements are generally connected together with a single controller 20 managing distribution of a single set of instructions to a plurality of chains of APEs 21 and associated dedicated SDMCs 22.

This is a useful architecture for high-throughput data processing, and is designed to have excellent scalability for a wide range of applications. However, the feature of excellent scalability comes at a cost and accordingly, for specific applications the structure described in FIGS. 1 and 2 has some limitations which restrict its throughput efficiency. More specifically, there is a disadvantage that the processing elements (PEs) in the above Linedancer™ processor are hardwired to have specific predetermined relationships with the controllers (LAC) and the SDMCs. Also the above processor architecture, due to its design, requires overlapping communication channels. This further limits the optimum efficiency, which can be achieved per unit area of processor because of having to coordinate communication across overlapping channels.

Furthermore, where a plurality of instructions streams are to be used, in a pseudo MAID (Multiple Instruction Multiple Data) manner, this would require a plurality of processors to be implemented in parallel. The problem with this is that the PEs of one processor are only able to see their direct neighbours rather than all of the PEs working together. This places further constraints on how data can be handled and limits potential processing efficiency. In particular, additional components such as routers (described for example in our co-pending patent application EP01456749) become necessary to handle communication across non-adjacent processing elements, thereby increasing the complexity of the processor design.

It is desired to overcome at least some of the above-described problems. More specifically, it is desired to provide an improved data processing architecture, which is more flexible and has a greater processing efficiency than has been obtained previously.

SUMMARY OF THE INVENTION

According to one aspect of the present invention there is provided a parallel processor for processing a plurality of different processing instruction streams in parallel, the processor comprising: a plurality of data processing units; and a plurality of SIMD (Single Instruction Multiple Data) controllers, each connectable to a group of data processing units of the plurality of data processing units, and each SIMD controller arranged to handle an individual processing task with a subgroup of actively connected data processing units selected from the group of data processing units; wherein the parallel processor is arranged to vary dynamically the size of the subgroup of data processing units to which each SIMD controller is actively connected under control of received processing instruction streams, thereby permitting each SIMD controller to be actively connected to a different number of processing units for different processing tasks.

It will be understood that different tasks have different processing requirements—a simple task will therefore demand fewer processing units than a more complicated task. Therefore, since an individual SHAD controller handles each task, it is advantageous to allocate dynamically the number of data processing units that are connected to a given SIMD controller on a task-by-task basis. This is so that the most appropriate (efficient) number of data processing units can be assigned for a given processing task. This prevents over or under utilisation of data processing units, improving efficiency and providing flexibility in processing power allocation to tasks.

Furthermore, since the processing instructions control active connectivity, dynamic allocation can be performed on the fly, in real time, as the instructions are being processed, thereby very quickly adapting the number of processing units for a given task. It is to be understood that the term 'active' when used in respect of a connection refers to actual use of the physical connection that is provided as the connection. Whilst many connections are provided within the processor, only some of them will be active for a given processing task and 'active' connections never overlap.

Preferably, the processing instruction streams comprise one or more processing tasks. This is advantageous because a processing task to be performed, and the number of data processing units appropriate for that task can be specified simultaneously under the same set of processing instructions. This means that when a programmer is writing software to generate the processing instructions, the programmer is given greater control over how tasks are to be handled by the parallel processor. In particular, the programmer can be given control of how each SIMD controller handles each task.

Preferably, each of the subgroups of data processing units to which a SIMD controller is actively connected does not overlap with another actively connected subgroup. Non-overlapping subgroups of data processing units result in each SIMD controller having its own dedicated subgroup of data processing units with which it is connected that it does not share with other SIMD controllers. The advantages associated with this include resource conflict avoidance, simplified processing instruction stream generation, and simplified processor architecture.

However, it is desirable for a SIMD controller to have a large choice of the number of data processing units to connect to. This choice can be maximised by increasing the group of possible data processing units to which each SIMD controller is connectable by allowing possible connections (physical connections) with data processing units to overlap. So preferably the group of data processing units to which one of the SIMD controllers is connected, overlaps with the group of data processing units to which another SIMD controller is connected. Thus, there may be a pool of data processing units that can be utilised by different SIMD controllers, one data processing unit per SIMD controller at a time. However, once a single data processing unit has been actively connected to a SIMD controller, it cannot connect to another SIMD controller until its current active connection has been relinquished—for example, after the processing task has been performed.

Preferably, the processor further comprises a plurality of data movement controllers, each being actively connectable to a unique selected subgroup of data processing units, one per associated SIMD controller, under control of the processing instruction streams.

The resulting structure would therefore typically feature a plurality of SIMD controllers, each with their own dedicated group of data processing units and associated dedicated data movement controller (such as a Secondary Data Movement Controller (SDMC)). The fact that there is only a single data movement controller per SIMD controller makes memory management for a particular task simpler, and does away with ancillary units (e.g. routers) that would otherwise be required to juggle memory requests per task. For a description of a prior known data controller including a router, reference is made to the applicant's co-pending application published as EP01456749. In particular, in prior known processors, each processing element (a sub-element of a processing unit) has its own data movement controller. Therefore, if data needs to be transferred between processing elements, a router is required to implement the data transfer. However, with the present arrangement, each group of data processing units, and processing elements within those processing units is able to access a common data movement controller.

Therefore, the processor of the present invention has the flexibility to, under the control of processing instruction streams, reconfigure itself to control dynamically how its components (e.g. SIMD controllers, data processing units and data movement controllers) are connected to one another.

This is not an obvious design choice to make, as allowing such connectivity comes at the cost of requiring additional connections between components of the parallel processor. For example, the connections would typically comprise a large number of overlapping data routes between different SIMD controllers and multiples of possible processing units and also between each processing unit and plurality of data movement controllers.

However, the applicant has appreciated that the space on-chip occupied by the additional connections can be offset against the space that would be otherwise be taken up by other on-chip features (e.g. routers)—but are not required using the present architecture. Additionally, a great deal of flexibility is provided by the enhanced connectivity as a result of the additional connections. However, there is a trade off between the flexibility provided by a greater number of possible connections and the cost in the chip area consumed by such connections and the resulting complexity of the chip itself.

Preferably, the plurality of data processing units are connected together sequentially in a string formation, and each data processing unit in the string being in communication with its neighbouring data processing units.

This has the advantage of promoting communication between adjacent data processing units within the string and at the same time, simplifying the geometric design of the processor and thus enables all of the benefits of string processing architecture to be attained.

Preferably, the selected subgroups are consecutively arranged. In other words, it is preferably for a first and a second subgroup, each of which comprises contiguously positioned data processing units, to be selected to be adjacent to one another, without a data processing unit not assigned to a subgroup in between.

This arrangement of selected subgroups being next to one another facilitates forming the processing units into a string of selected processing units to take advantage of string processor architecture.

Preferably, the plurality of SIMD controllers are arranged in a sequence with a first SIMD controller arranged to handle a first set of processing tasks as determined by a first instruction stream. Preferably, the SIMD controllers are arranged in a sequence with the second SIMD controller in the sequence being arranged to handle a second set of processing tasks as determined by a second instruction stream.

Therefore, it will be understood that at a given time, if there are only two streams of processing tasks to be handled, the first two SIMD controllers of the architecture in the sequence will be assigned to those streams of tasks. Subsequent available SIMD controllers in the architecture will therefore be unused, and disposed towards the last of the sequence of SIMD controllers. In other words, whilst a comprehensive architecture is provided within the data processor, the flexible use of that architecture means that for some applications or tasks, some of the available resources of that architecture will not be used.

Preferably, the first SIMD controller in the sequence is connected to a first subgroup of data processing units each of which are sequential, and together are the first data processing units of the string formation. Similarly, it is preferred that the second and subsequent SIMD controllers are each connected to a respective second and subsequent subgroup of data processing units, each of which are sequential, and together are the respective second and subsequent subgroups of the string formation.

Therefore, it will be understood that data processing units that do not constitute a subgroup (i.e. are not being used to handle a processing task) will be disposed towards the last in the string of data processing units. As mentioned, and as will be elaborated on below, this facilitates control of the components that are to be used for a given task, and those which are not, for example, allowing entire sections of components not being used to be turned off or placed into a standby mode (using very little power) to reduce power consumption of the processor.

Additionally, any one SHAD controller is typically not connectable to all of the plurality of data processing units only a group from within that plurality. However, each SIMD controller may be connected to a group of processing units, which are most likely to be selectable in most applications. This is again to balance the degree of connectivity provided with the amount of chip area (real estate) this consumes. Therefore, sequential selection of SMD controllers, and its associated data processing units, minimises the chance that a SMD controller is unable to form connections to data processing units that are available (unused for a task), but to which the SIMD controller is not physically connectable.

Preferably, SIMD controllers and/or data processing units and/or data movement controllers that are not required for handling processing tasks can be selectively disabled from taking part in the current task by the processor.

It is to be appreciated that the processor can disable the SIMD controllers and/or data processing units and/or the data movement controllers at the same time as other SIMD controllers and/or data processing units and/or data movement controllers, which are required for handling processing tasks, are enabled. Preferably the processing elements to be used for a given task are defined in a map, which provides a map of all of the available processing units, indicates whether the processing units are to be active in the current task.

A fetch map may further advantageously define the connectivity between, and actuation of, given SIMD controllers and data movement controllers. The term 'fetch map' derives from the concept that communications between processors is defined in terms of a given processor fetching its data from a remote processor, rather than the remote processor despatching data to a requester.

Disabling SIMD controllers and/or data processing units and/or data movement controllers that are not used for a task is advantageous because it minimises power consumption, which is particularly suited for application of the present parallel processor in battery-powered devices such as mobile devices (laptops, mobile phones etc).

Preferably, the instructions of the instructions streams define the sizes of the subgroups and the order in which the subgroups are to be configured from one end of an array of the plurality of processing units to an opposite end of the array. This enables very efficient configuration of the processor using for example just two parameter values, one for group sizes and the second for group ordering.

Generally, the connectivity of processor units to each SIMD controller, supports the concept of 'clusters' of processor units under the possible control of more than one SIMD controller. This raises the possibility of 'pools' of PUs or PEs being dynamically (i.e. in run-time) configured under the control of a given controller. This advantageously leads to a SIMD (i.e. PUs doing the same task) plus MIMD (i.e. clusters of PUs performing a different task from other clusters). The mapping of PUs to controllers described here implies a grouping of any PU to up to two controllers. The concept is extendable.

Furthermore, the concept is extended to having a pool of data movement controllers (SDMCs), which can also have a plurality of possible connections to the plurality of processing elements and wherein each cluster of processing elements is selectably connected to a given one of the data movement controllers (SDMCs). The selection is also configurable in run time by the controlling instruction stream. This extra level of dynamic selection enables further flexibility in the assignment of specific data movement controllers to clusters of processing elements and making and dissolving these relationships quickly and as required to maximise efficient use of the processing architecture.

Alternatively, the present invention can be seen to reside in the concept of having pools of SIMD controllers being flexibly coupled to a pool of processing units such that each SIMD controller can be selectively configured to operate with an instruction-stream defined group of processing elements from the pool of processing units. The software-defined relationships can just as easily be dissolved and restructured to provided a very high degree of flexibility.

DETAILED DESCRIPTION OF THE PRESENT EMBODIMENTS

The present embodiments of a high-performance flexible scalable processor are described at two levels. The first level provides a higher overview of the components of the embodiment and their configurable connections. The second level provides a more detailed description of the specific components within each SIMD controller, which enables the configurable configurations to be implemented.

Figure 3A:
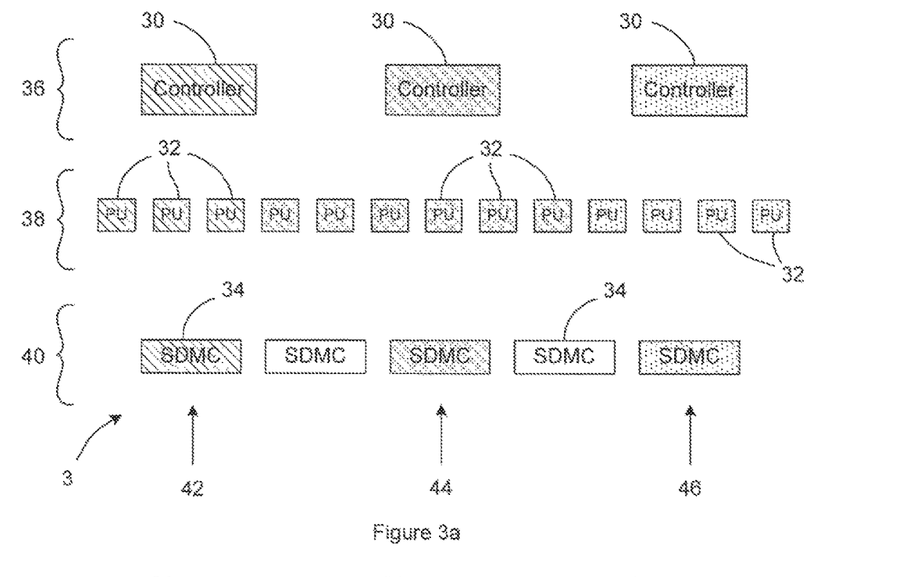
FIG. 3a is a schematic block diagram showing how, in one specific example, an array of SIMD controllers according to the present embodiments are operably connected to a pool of data processing units (PUs) and a pool of secondary data movement controllers (SDMCs) for performing a given function.
Figure 3B:
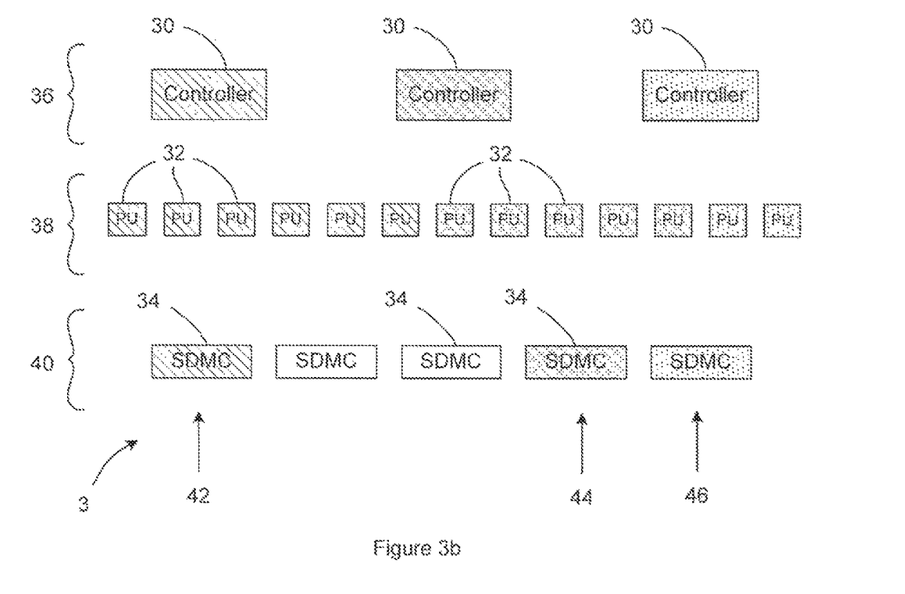
FIG. 3b is a schematic block diagram showing the same SIMD controllers, data processing units and SDMCs as in FIG. 3a, but showing another different example of the way in which the SIMD controllers can be connected to the pool of respective processing units and SDMCs.

Turning to the first level and referring to FIGS. 3a and 3b, the high-performance flexible scalable processor 3 has three different types of components, namely SIMD controllers 30, data processing units (PUs) 32 and secondary data movement controllers (SDMCs) 34. Each PU 32 is comprised of a plurality of interconnected PEs (not shown).

Components of the same type are arranged in pools, with each pool comprising a plurality of components. For example, within this current processor 3, there is a pool 36 of SIMD controllers 30, a pool 38 processing units 32 and a pool 38 SDMCs 40.

The pools of resources 36, 38,40 can be connected together in many different ways so that when the components are connected to one another, they can together handle one of a number of different processing tasks issued by processing instructions. The way that each of the components are connected together for performing a specific task is also specified by the processing instructions, and so the arrangement of different components can be configured dynamically in real time by the processing instructions in a way most efficient or appropriate to handle any given processing task.

The arrangement of these pools 36, 38, 40 within the high-performance flexible scalable processor 3 functions as a MIMSIMD (Multiple Instruction Multiple (Single Instruction Multiple Data)) processing architecture of the present embodiment. This architecture can handle different processing tasks simultaneously, wherein each task comprises common instructions being applied to a plurality of data fields.

The data processing units are made up of a large number of data processing elements which are, like the prior art, arranged in a string, but unlike the prior art are non-associative—i.e. the processing elements do not each have a dedicated memory. This represents one important difference between the present invention and the prior art.

As mentioned, the processor 3 is configured by the processing instructions in real-time to allocate a task to a SIMD controller 30. The instructions also allocate a selected plurality of data processing units 32 and a selected SDMC 34 to that SIMD controller 30. Whilst many different connections are possible, the instructions specify the specific selected connections to be used for the current processing task.

FIGS. 3a and 3b show two possible ways in which the processor 3 can be configured by the processing instructions during run-time. It is important to note that the same physical processing architecture is shown in both FIGS. 3a and 3b, and merely the configurations, namely selected active connections are different and these have been shown schematically by virtue of the different shading which has been applied to connected elements. Referring to the configuration shown in FIGS. 3a and 3b, it can be seen that each one of the available data processing units 32 is assigned to both a SIMD controller 30 and a specific SDMC 34. This is important to ensure the correct SIMD operation of this part of the processor 3, namely the provision of a single stream of instructions to multiple processing units 32 and using a single SDMC 34. In the example shown, three SIMD configuration clusters 42, 44, 46 are shown and distinguished by use of different shading.

Also it is to be appreciated that all of the available data processing units 32 are utilised in order to ensure that the processing elements are arranged as a string processor. This has particular benefit in that lateral communications within the pool 38 of processing units 32 are possible.

Furthermore, it is not necessary to use each controller or SDMC in a particular configuration. It can be that some SDMCs 34 or controllers 30 would not be used for certain processing tasks. In particular, it can be seen that two SDMCs 34 (not shaded) are not being used in either of FIGS. 3a and 3b.

FIG. 3a shows a particular configuration of the architecture of the processor 3, where the first SIMD controller 30 (counting from the left in FIG. 3a) is assigned the first three data processing units 32 (also counting from the left in FIG. 3a) and the first SDMC 34 (again counting from the left in FIG. 3a) is coupled to these data processing units 32, which in combination make up the SIMD configuration cluster 42. The second SIMD controller 30 is assigned the next five data processing units 32 and the third SDMC 34 is coupled to these data processing units 32, which in combination make up the SIMD configuration cluster 44. Finally, the third SIMD controller 30 is assigned the next four data processing units 32 and the fifth SDMC 34 is coupled to these data processing units 32, which in combination make up the SIMD configuration duster 46.

FIG. 3b shows a different configuration of the same architecture, which has been dynamically changed by the processing instructions from that shown in FIG. 3a. Here the SIMD first controller 30 (counting from the left in FIG. 3b) is assigned the first six data processing units 32 (also counting from the left in FIG. 3b) and the first SDMC 34 (counting from the left in FIG. 3b) is coupled to these data processing units 32, which in combination make up the SIMD configuration cluster 42. The second SIMD controller 30 is assigned the next five data processing units 32 and the fourth SDMC 34 is coupled to these data processing units 32, which in combination make up the SIMD configuration cluster 44. Finally, the third SIMD controller 30 is assigned the next two processing units 32 and the fifth SDMC 34 is coupled to these data processing units 32, which in combination make up the SIMD configuration cluster 46. Each different SIMD controller 30 handles a different instruction stream and operates on its respective SIMD configuration cluster 42, 44, 46.

Thus it can be seen that the processing instructions control the configuration of the processor 3 and clusters 42, 44, 46 performing a specific task can be formed and dissolved readily and automatically in run-time without manual intervention. This ability to change the configuration of the data processing architecture using processing instructions, in this dynamic way, is a key feature of the described embodiments of the present invention. In the present non-limiting embodiments, up to thirteen clusters 42, 44, 46 are provided for handling encoding of different components, regions or tools associated with the encode/decode of high-definition images. Each stream of data can be handled in a different way under control of its own controller 30. The configuration is set up to digitally encode/decode high-definition images/video signals input into the processor 3.

It is to be appreciated that the number of SIMD controllers 30, data processing units 32 and secondary data movement controllers 34 shown are exemplary only, and that the present invention is not limited to the particular numbers shown and described herein.

Also it is not necessary for there to be complete possible connectivity provided between all components of the processor 3. Rather, so long as there is some choice for the connections the data processing architecture, which can be selected by processing instructions of the present invention as defined in the present claims can be achieved.

Figure 4:
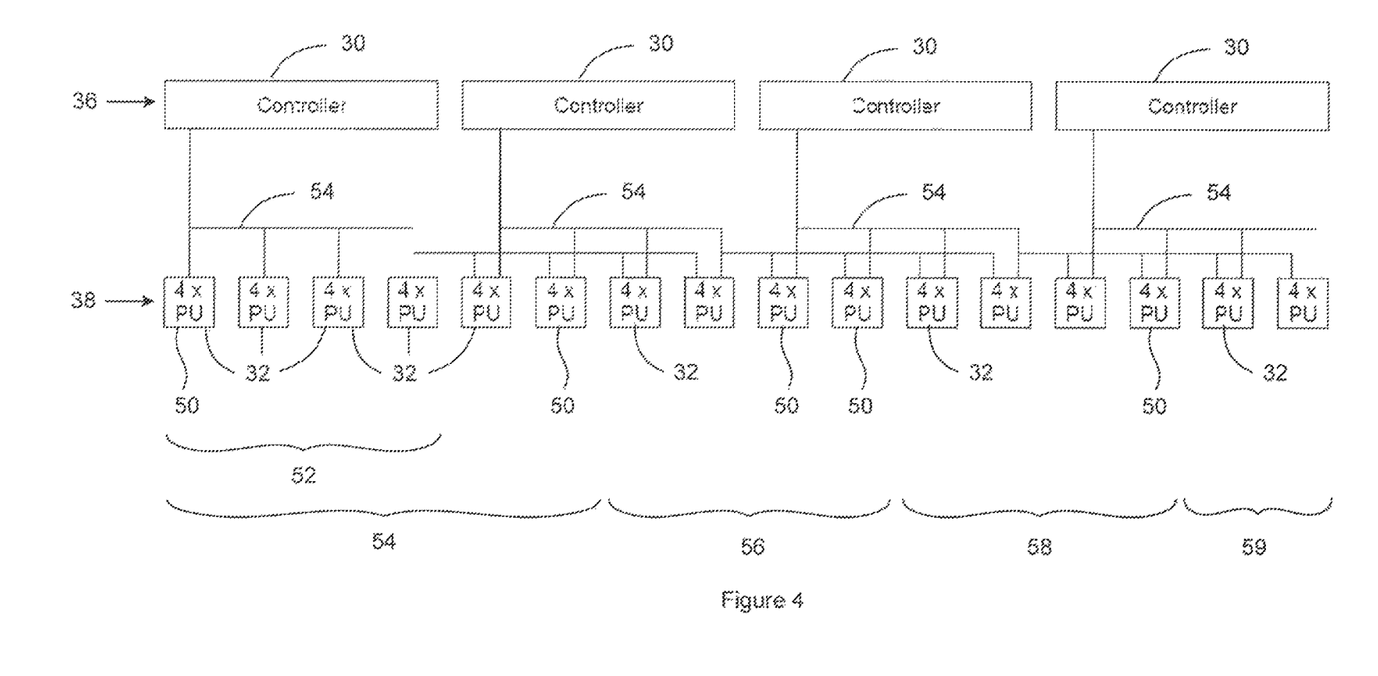
FIG. 4 is a schematic block diagram of a possible connectivity arrangement between four SDMC controllers and 64 PUs in another embodiment of the present invention, showing in detail the available physical connections between the pool of controllers and the pool of processing elements from which the active connections are selected.

For example, FIG. 4 shows another data structure of an embodiment of the present invention. To avoid unnecessary repetition, the connections between the processing units 32 and the SDMCs 34 are not shown in this figure or described in detail. Nevertheless, they exist in a similar manner to that described above, in this embodiment.

FIG. 4 shows four SIMD controllers 30 are provided and 64 processing units 32 which are grouped into sixteen sets 50 of four units. The first four (counting from the left in FIG.

4) sets 52 of PUs 32,50 are physically connected by connectors 54 to a single controller 30 (the first one counting from the left in FIG. 4) whereas each of the remaining sets 50 of PUs 32 are each physically connected by connectors 54 to two different controllers 30. These physical connections 54 provide the group of possible connections from which the actual live (current) connections are selected by processing instructions for a given processing task. Clearly, the greater the number of physical connections 54, the greater the choice of possible connections and configuration flexibility of the processor 3. However, this flexibility comes at a price of increased complexity in connections 54 and usage of valuable chip area. Therefore, as shown in FIG. 4, it is preferable to balance the flexibility of design with the cost of that flexibility in an optimum solution.

An example of how the PUs 32 of the embodiment shown in FIG. 4, may be assigned to a given duster 42, 44, 46, in this non-limiting particular arrangement, is to use the first six (counting from the left in FIG. 4) sets 50 of PUs 32 (i.e. 24 PUs) as a main duster 54 for data processing of a main task in the single instruction stream (under control of the first SIMD controller 30), the next four sets 50 of PUs 32 as a second cluster 56 for processing small dedicated tasks from the same instruction stream (under control of the second SIMD controller 30) and the remaining four sets 50 PUs 32 as a third cluster for small but undefined tasks (under control of the third SIMD controller 30). The final SIMD controller 30 and two sets 50 of PUs 32 as the remaining cluster 59 may be unused.

In the preferred embodiment shown in FIG. 4, all controllers except the first controller (on the right) connect to 32 PUs. The first controller only connects to 16 PUs.

Figure 5:
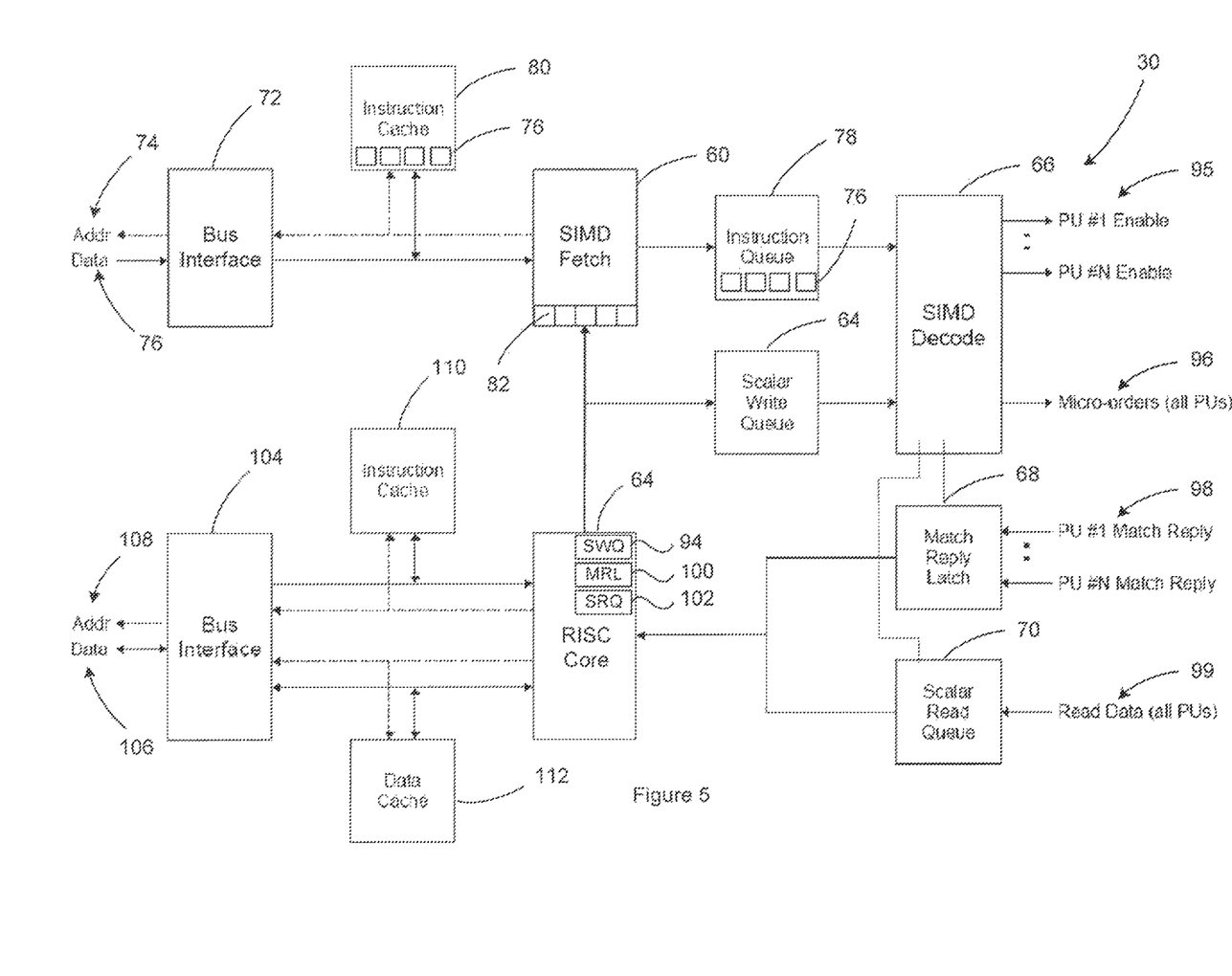
FIG. 5 is a block circuit diagram of control architecture of a SIMD controller of FIG. 3 or 4, according to a first embodiment of the invention.

Turning now to the second more detailed level of the description, the specific control architecture of the controller 30 used in the first embodiment is shown in FIG. 5. The controller 30 comprises six main components, namely a SIMD Fetch Unit 60, a RISC (Reduced Instruction Set Computing) Core Processor 62, a Scalar Write Queue 64, a SIMD Decode Unit 66, a Match Reply Latch 68 and a Scalar Read Queue 70. The way in which these components work together with the other supporting components to affect the functionality of the controller 30 is now described.

The primary roll of the SIMD Fetch Unit 60 is to get instructions for the SIMD Decode Unit 66 from main memory (not shown). It fetches linear sequences of instructions from external program memory (not shown and not part of the processor 3) via a bus interface 72 to which it is coupled. The bus interface 72 effectively goes to specified addresses 74 and reads the data (instructions) 76 stored at those addresses 74. The SIMD Fetch Unit 60 then stores the instructions 76 in an instruction queue 78 coupled to the SIMD Fetch Unit 60 to provide subsequently to the connected SIMD decode unit 66.

The SIMD Fetch Unit 60 maintains a local instruction cache 80 of instructions 76 retrieved via the bus interface 72. These instructions are multi-word instructions. In particular, the first instruction word indicates which of the remaining words are explicitly coded. Also default values are used for non-coded words.

The controller 30 also includes the tightly coupled RISC core processor 62 which has a highly-pipelined architecture and operation. The provision of the RISC processor 32 provides less flexibility and makes the processor architecture less readily scalable. However, this tight coupling does advantageously provide a faster processing throughput. More specifically, where in previous architectures dedicated repetition engines have been provided in addition to the CPU with the necessary queues between the CPU and the repetition engines (see for example our U.S. Pat. No. 6,625,772), the tight coupling removes the need for queues and specific registers (not shown) are provided in the RISC processor CPU 62 to handle instruction fetch with looping.

In order to facilitate this tight coupling, the SIMD Fetch Unit 60 of this embodiment specifically has five directly accessible dedicated registers 82 (e.g. application-specific registers in the SPARC architecture). These registers 82 enable the control of the SIMD Fetch Unit 60 by the RISC processor to be fast and direct. Such a scheme is only desirable and feasible if the RISC processor is dedicated to the task, a solution made feasible by the high levels of integration made feasible by modern semiconductor system-on-chip integration. These registers 82 and their functionality are each described below with reference to FIG. 5a.

Figure 5A:
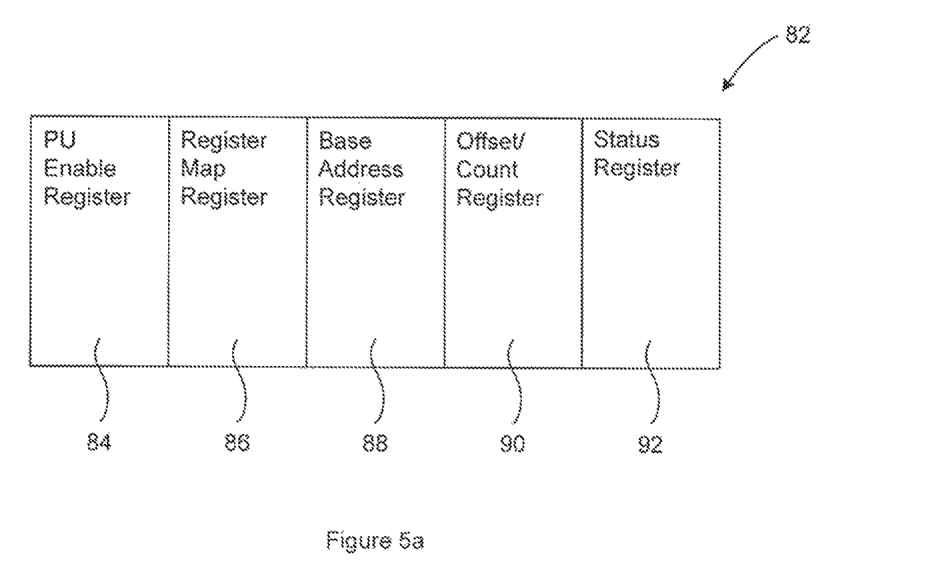
FIG. 5a is a schematic block diagram showing the registers provided within a SIMD Fetch Unit of the SIMD controller of FIG. 5.

Five specific registers 82 are provided, namely a PU Enable register 84, a Register Map register 86, a Base Address register 88 and Offset/Count register 90 and a Status register 92.

The PU Enable register 84 acts to select which PUs 32 are activated. This register 84 is typically set once for a given task by the processing instructions and is dynamically changed at any time.

The Register Map register 86 functions to map "parameterised" processor registers to real physical registers. In this manner, a common sequence of processor instructions fetched from memory and applied to the parallel processor may operate with different localized register definition, rather than the register definitions being defined in advance as "literals" in the code. This scheme allows fragments of code to be extensively reused with different ("parameterized") register definitions per call. The Register Map register 86 is typically set on entry to a function containing processing instructions. As an alternative implementation, the Register Map register 86 may be implemented as a logical queue, enabling multiple parameterized register definitions to be enqueued in advance and dequeued ('pop' operation) as required.

The Base Address register 88 is used to specify the base address of the SIMD program and is typically set once. The value of this register only needs to be changed dynamically if the program size exceeds the maximum offset value.

The Offset/Count register 90 is used to control the operation of the SIMD fetch unit 60. Each write of a data value to this register 90 from the RISC Core processor 62 causes the SIMD fetch unit 60 to fetch a single sequence of instructions. Whilst not shown, the Offset/Count register 90 is backed by a preferably short request queue, which is provided between the RISC Core processor 62 and the register 90. In operation, the RISC core processor 62 stalls when the request queue is full.

The Status register 92 stores a data value, which indicates the current status of all SIMD units and the queues of the SIMD controller 30.

The above-described architecture advantageously makes the control software (instructions) for the controller 30 amenable to being processed using standard compiler techniques. This lowers the cost and increases the ease of use of the present embodiment by programmers wishing to execute a specific set of processing tasks.

In the first embodiment shown in FIG. 5, a Scalar Write Queue 64 is also provided which has several specific properties. For example, the Scalar Write Queue 64 holds scalar data values calculated at run-time by the RISC core processor 62. It allows scalar data values to be derived from function parameters (in the received instructions). The Scalar Write Queue 64 is tightly coupled to the RISC core processor 62 by virtue of having a single, directly-accessible register (an SWQ register) 94 (e.g. application-specific register in the SPARC architecture). In operation, the RISC core processor 62 stalls, if it tries to write to the SWQ register 94 when there is no space in the Scalar Write Queue 64.

The SIMD Decode Unit 66 consumes instructions from the Instruction Queue 78 and data from the Scalar Write Queue 64. The outputs of the SIMD Decode Unit 66 provide the enable signals 95 to each of the processing units 32 to determine which ones of the PUs are active for the current instruction. It also decodes instructions to generate micro-orders 96 that are broadcast (output) to the PUs 32.

The SIMD Decode Unit 66 is also responsible for managing (controlling) a match reply capture process, which is implemented with the use of the Match Reply Latch 68. In use, those PUs 32 that have a selected flag set in their local flag register (not shown), indicate this by way of asserting their respective Match Reply lines 98. This feedback is explicitly captured into the Match Reply Latch 68, which is termed the 'capture process'. The capture process is stalled by the SIMD Decode Unit 66 if the Match Reply Latch 68 contains unread data, namely data which has yet to be read (consumed) by the RISC core processor 62. The inputs to the Match Reply Latch 68 come from match reply outputs 98 of all of the PUs 32 in the "cluster" currently owned by the SIMD controller 30. In this manner, the RISC processor 62 can assess the selected flag status of any or all of the PUs 32 in the "cluster" currently owned by the SIMD controller 30. As an alternative in a further embodiment, the Match Reply Latch 68 may be replaced with a Match Reply Queue. This alleviates the frequency of stall events, since the RISC processor 62 can read from the head of the queue, whilst the SIMD processor 30 will stall less frequently only if the queue becomes full.

The SIMD Decode Unit 66 is also manages (controls) a scalar data read capture process which is implemented using the Scalar Read Queue 70. In use, the data read capture process reads data from a selected PU 32 from the "cluster" of PUs 32 currently owned by the SIMD controller 30. The read scalar data read process is stalled by the SIMD Decode Unit 66, if the Scalar Data Read Queue 70 is full. Here the inputs 99 are derived from all of the data outputs of the PUs 32 typically using an OR-tree or similar logical structure.

Looking at the Match Reply Latch 68 in greater detail, the Latch 68 operates to capture the match reply status of all connected PUs 32 in parallel. The match reply status for a specific PU 32 is the logical 'OR' of the match value in each of its enabled PEs (not shown) when the match reply status is captured. The match value may either be the true or complemented output of a Flag Register (not shown) of each PE, which indicates the match status of that PE. More specifically, the logical 'OR' of the true outputs of the PUs 32 indicates if a Flag Register is set in any enabled PE of that PU 32. Also the logical 'OR' of the complemented outputs of the PEs of a specific PE indicates if the Flag Registers are set in all enabled PEs of that PU 32.

In this process, the status for PUs 32 that are not enabled is masked. This advantageously allows for a simple test to determine if any/all enabled PUs are asserting a match reply to a match value broadcast by the SIMD Decode Unit 66.

The Match Reply Latch 68 is tightly coupled to the RISC Core Processor 62, by way of a single directly accessible MRL register 100. This MRL register 100 is an application-specific register in the in the SPARC architecture which provides the result of the Match Reply Latch 68 to the RISC Core Processor 62. In use, the RISC core processor 62 stalls if it tries to read the MRL register 100 before the match reply status has been captured by the Match Reply Latch 68.

The first embodiment of the invention, as described above, also comprises the Scalar Read Queue 70, which is controlled by the SIMD Decode Unit 66. The Scalar Read Queue 70 is arranged to capture a single read data item at a time. The data item is the output of the processor of an enabled PE. (Typically the data item 99 may be a 32-*bit* result stored in an output register of the enabled PE.) The outputs 99 of all enabled PEs are provided to the input of the Scalar Read Queue 70 via a suitable combining network such as an OR-tree or equivalent logical structure. Accordingly, the programmer (who has created the instructions) must ensure that only one PE is enabled at a time for each read data item 99 unless the programmer requires a bitwise—logical 'OR' operation of multiple enabled PEs.

The Scalar Read Queue 70 is tightly coupled to the RISC Core Processor 62, by way of a single directly accessible SRQ register 102. This SRQ register 102 is an application-specific register in the in the SPARC architecture which provides the result of the Scalar Read Queue 70 to the RISC Core Processor 62. In use, the RISC core processor 62 stalls if it tries to read the SRQ register 102 when there is no data in the Scalar Read Queue 70.

The first embodiment does not use repetition of SIMD fetch instructions, but rather simply fetches instructions 76 in an instruction stream from system memory (not shown). This assumes that the CPU instructions 76 can be supplied from system memory without difficulty, or be supplemented by a suitable cache. This is a very simple way of operating the controller 30, as it requires no code store unit or parameter fetch map store to be provided. If sufficient memory bandwidth is available then, the instruction cache 80 can be kept very small saving valuable space on the semiconductor chip and thereby saving costs.

The RISC Core Processor 62 has its own bus interface 104, which is used to obtain and store data 106 in main memory (not shown). The addresses 108, at which data is either read from or written to, are generated from within the RISC Core Processor 62. Further an instruction cache 110 is also provided in a similar manner to the above-described instruction cache 80 and also a data cache 112 enables frequently used data to be retained dose to the RISC Core Processor 62 for faster reading.

Thus the bus interface 104 is used for handling data and instructions for the RISC core processor 62, namely instructions for the operation of the SIMD controller 30 whereas the bus interface 72 is used to obtain instructions for the PUs 32, which are to be enabled for implementing those instructions.

Figure 6:
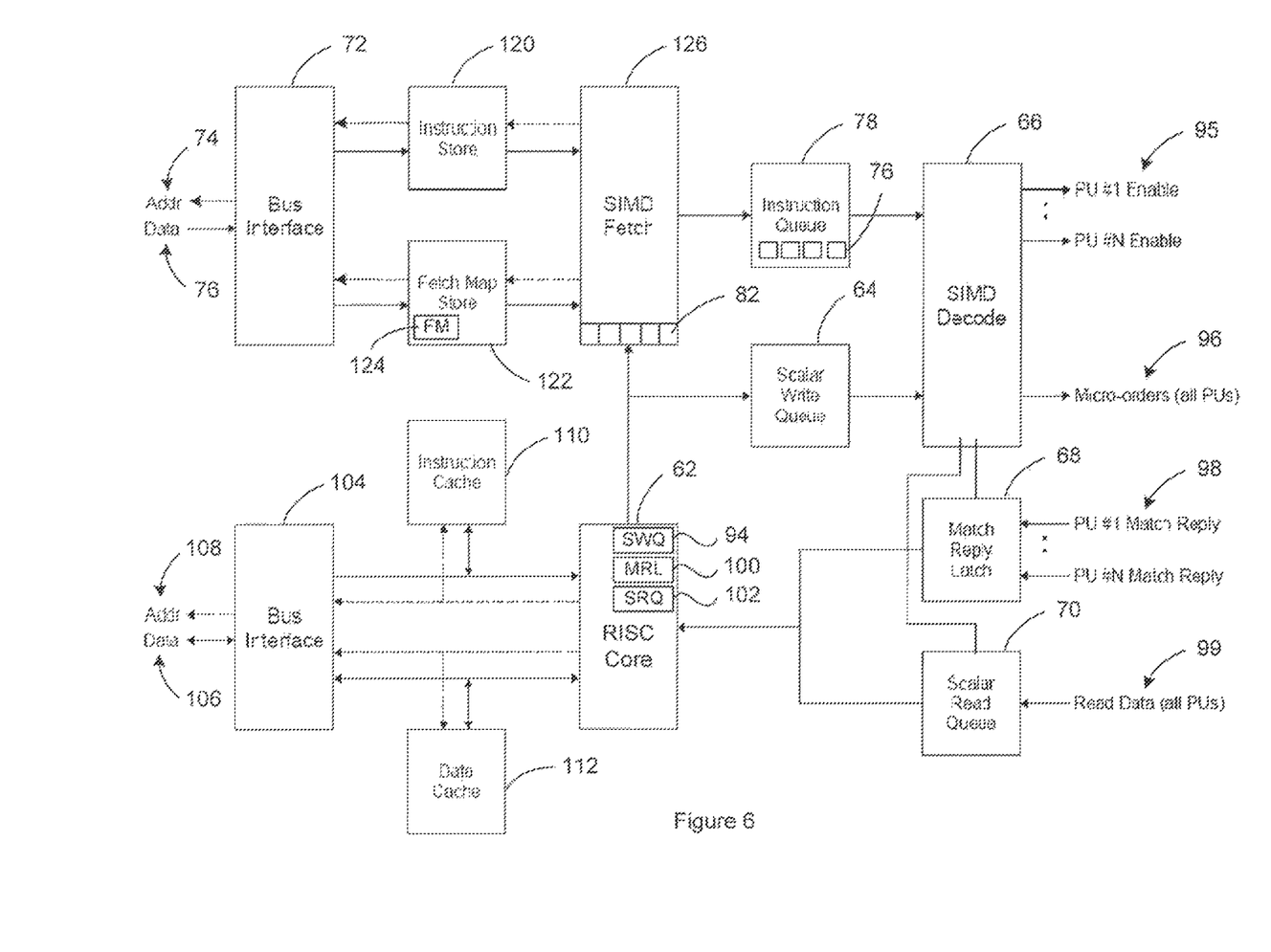
FIG. 6 is a block circuit diagram of control architecture of a SIMD controller of FIG. 3 or 4, according to a second embodiment of the invention.

FIG. 6 shows a SIMD controller 30 of a second embodiment of the present invention. The controller architecture is very similar to that of the controller 30 shown in FIG. 5 and the same reference numerals have been used to indicate equivalent components. However, the SIMD controller 30 of the second embodiment achieves the same objective as the controller 30 of the first embodiment, in a slightly different way. The main difference is the way in which instructions for the PUs 32 are retrieved and processed (via the bus interface 72). Here SIMD parameterised instructions are not fetched from system memory (not shown) and executed. The execution of parameterised instructions in this way requires there to be a code store and a fetch map store. This is provided in the form of an instruction store 120 and a fetch map store 122 which are provided in place of the instruction cache 80 of the first embodiment.

The provision of the instruction (code) store 120 and the fetch map store 122 creates a larger on-chip memory requirement, for example requiring 32 KB of memory as compared to the 1 KB of memory for the instruction cache 80 of the first embodiment.

However, more deterministic behaviour is guaranteed as a result (i.e. not governed by the non-deterministic statistical nature of the cache in the first embodiment).

A fetch map 124 is a mapping (typically a non-regular pattern) of the different PUs 32 involved in a particular communications instruction. The fetch map 124 thus provides a list of all PUs 32 that are to be enabled for a class of inter-processor communication, without requiring any calculation by the SIMD controller 30. Thus, a fetch map 124 can be used to execute instructions on selected PUs from an array of PUs 32 in a very efficient manner. Fetch maps 124 are the subject of a co-pending patent application by the applicant.

The SIMD Fetch unit 126 of the second embodiment is very similar to the SIMD control unit 60 of the first embodiment. Accordingly, for the sake of brevity, only the differences between the SIMD fetch units 60,126 of the two embodiments will be described herein. The SIMD fetch unit 126 fetches linear sequences of instructions 76 from the instruction store 120 which have been pre-fetched from main memory (not shown). The SIMD fetch unit 126 stores the instructions 76 in the instruction queue 78. Also non-regular fetch maps 124 are taken from the separate fetch map store 122 and used to determine (in the SIMD decode unit 66, which PUs 32 are participating in the communication operation.

Figure 6A:
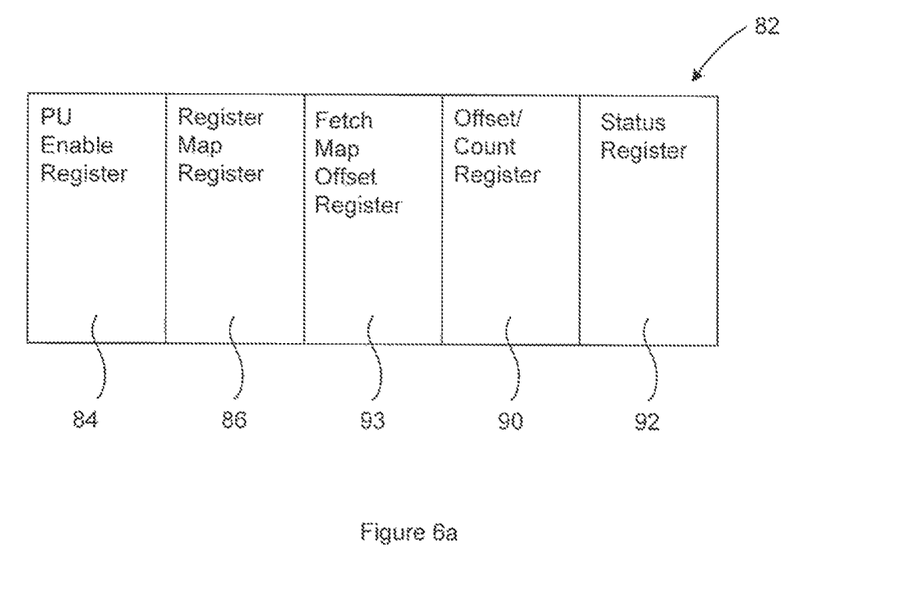
FIG. 6a is a schematic block diagram showing the registers provided within a SIMD Fetch Unit of the SIMD controller of FIG. 6.

The RISC core processor 62 is also tightly coupled to the SIMD Fetch unit 126 as in the first embodiment. Again five registers 82 are provided as shown in detail in FIG. 6a, four of which comprise a subset of the five registers 82 described in the first embodiment, namely the PU Enable register 84, the Register Map register 86, the Offset/Count register 90 and the Status register 92. None of these are described further as they have been described previously. The addition of a separate Fetch Map Offset register 93 allows the SIMD controller 30 to execute a common sequence of instructions from the instruction store 120 whilst consuming fetch maps 124 from the fetch map store 122 at a separately definable offset into the fetch map store 122. This advantageously allows code compression by allowing common instruction sequences to be reused with different fetch maps.

As can be seen by returning to FIG. 4, each PU 32 of that arrangement is connected (actively connectable) to either one or two controllers and there are less controllers than PUs 32 such that at least some of the PUs 32 have connections to more than one controller 30. Thus, the connectivity of the PUs 32 to the SIMD controllers 30 enables the concept of 'dusters' 54, 56, 58, 59 of PUs 32 to be under the possible control of more than one SIMD controller 30 as has been described before. Each PU 32 is configured to enable signals from the controllers 30 to be used to determine which controller 30 the specific PU 32 is to listen to for instructions. However, it is the programmer's responsibility via the writing of correct configuration instructions to ensure that two or more controllers 30 do not attempt to activate a given PU 32 simultaneously. Very importantly, this advantageously allows a 'pool' 38 of PUs 32 to be dynamically (i.e. in run-time) configured under the control of a given controller 32.

This reconfigurable ability advantageously enables an essentially SIMD (i.e. PUs doing the same task) processing architecture to carry out MIMD operations (i.e. dusters of PUs performing a different task from other dusters) thereby making up configurable task execution groups or dusters.

Figure 7:
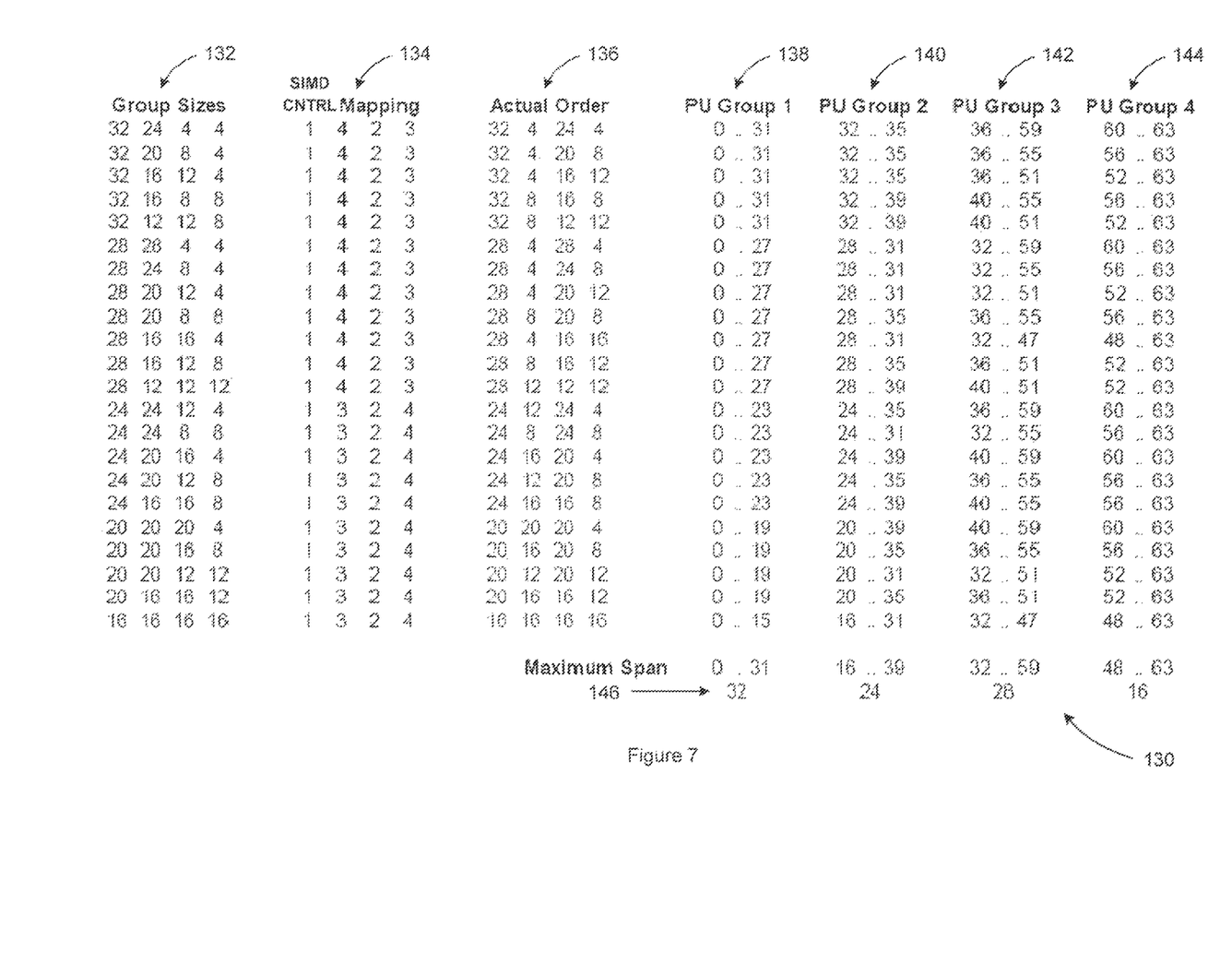
FIG. 7 is a table that shows the controller to PU mappings (clustering of PUs) possible using the architecture set out in FIG. 4, according to an embodiment of the invention.

Referring now to FIG. 7, different configurations which are possible using the present structure are set out in a table 130 and the effects on the size of data which is processed are described. The purpose of this diagram is to show the flexibility and choice available to the programmer for implementing different tasks. More specifically, the first column 132 in the table 130 of FIG. 7 sets out the different possible group sizes (cluster sizes) which are possible for the 64 PUs solution shown in FIG. 4. The next column 134 sets out the SIMD controller mapping which determines the order in which the different size groups (dusters) are to be configured from one side of the group to the other (for example from left to right in FIG. 4) The next column 136, sets out the actual order of the groups according to the SIMD controller mapping column 134. Finally, the PUs 32 of the four different groups (dusters) defined by the selected configurations are set out respectively in the following four columns 138 (PU group 1), 140 (PU group 2), 142 (PU group 3), 144 (PU group 4) together with the maximum span 146 of PUs 32 for each group (duster).

Thus it is possible, in processing instructions, to readily configure the controllers and PUs shown in FIG. 4, by simply indicating in the instructions to the SIMD controllers 30, which one of the 22 possible group sizes 132 have been selected and which one of the SIMD Controller mappings 134 is to be used. These two variables 132, 134 (highlighted in FIG. 7) then can configure the whole MIM(SIMD) operation of the high-performance flexible scalable processor 3.

It is to be appreciated that the feature in the above controller architectures being used under software control to switch off (disable) certain PUs 32 is one which leads to highly advantageous application in mobile telecommunications or computing applications. In this regard, software control of the number of processing elements/processing units which are active has a direct affect on power consumption of the circuit. By disabling PUs 32 not involved in the current required computing, the power consumption reduces and with a mobile computing or telecommunications application there is a resultant saving of precious battery life. By actively controlling and minimising the number of PUs participating in a SIMD instruction, battery life is substantially extended.

Furthermore, the power saving can be computed to determine the exact amount of extension of the battery life. Thus better estimates of the amount of remaining battery life can be made as can the likely battery consumption for a given processing task.

Having described presently preferred embodiments of the present invention in detail, it is to be appreciated that the above-described embodiments are exemplary only and variations and modifications will be apparent to those skilled in the art without departure for the spirit and scope of the invention as set forth in the appended claims. For example, some of the physical connections (which provide selectivity in active connections) shown in FIG. 4 could be eliminated. Thus a reduced set of connections and reduced selectivity can be provided to result in a reduced number of required connections between the different PUs and the controllers. Also the converse is true, in that more connections can also be provided (for example such that there are more than two controllers available for an active connection to a single PU) where there is a need for a more flexible set of possible connections at the expense of an increase number of chip area consuming connections between the PUs and the controllers.

Furthermore, the above-described embodiments are application independent, but have a particular benefit in battery-driven power source implementations.

The invention claimed is:

1. A parallel processor for processing a plurality of different processing instruction streams in parallel, the parallel processor comprising:
   a plurality of data processing units; and
   a plurality of Single Instruction Multiple Data (SIMD) controllers, wherein
      each SIMD controller among the plurality of SIMD controllers is configured to be permanently connectable to only a group of data processing units of the plurality of data processing units, wherein the group of data processing units is less than the plurality of data processing units, and each SIMD controller among the plurality of SIMD controllers is further configured for handling an individual processing task with a subgroup of actively connected data processing units selected from the group of data processing units, wherein the subgroup of actively connected data processing units selected from the group of data processing units does not overlap with another subgroup of actively connected data processing units selected from another group of data processing units,
      each SIMD controller among the plurality of SIMD controllers is configured for enabling data processing units selected from the group of data processing units in accordance with instructions such that a size of the subgroup of data processing units can be varied dynamically under control of the instructions, thereby permitting each SIMD controller to be actively connected to a different number of data processing units for different processing tasks, and
      each SIMD controller among the plurality of SIMD controllers comprises
         a SIMD instruction fetch unit configured for fetching the instructions from a memory external to the parallel processor,
         a SIMD decode unit configured for:
            decoding the instructions fetched by the SIMD instruction fetch unit, and
            forwarding micro-orders generated from the instructions fetched by the SIMD instruction fetch unit to enable the data processing units selected from the group of data processing units in accordance with the instructions.

2. The parallel processor of claim 1, further comprising:
   a plurality of data movement controllers, wherein each data movement controller among the plurality of data movement controllers being connectable to a selected subgroup of actively connected data processing units.

3. The parallel processor of claim 1, wherein the plurality of data processing units are coupled sequentially in a string formation.

4. The parallel processor of claim 3, wherein the instructions define sizes of subgroups of data processing units and an order in which the subgroups of data processing units are to be configured from one end of the string formation of the plurality of processing units to an opposite end of the string formation.

5. The parallel processor of claim 1, further comprising an instruction store and a parameter store, the instruction store being arranged to obtain and store instructions received via a bus interface for provision to the SIMD instruction fetch unit and the parameter store being arranged to fetch parameter and storing the parameters temporarily for use with stored instructions.

6. The parallel processor according to claim 1, wherein each SIMD controller further comprises a Reduced Instruction Set Code (RISC) processor and the SIMD instruction fetch unit comprises a plurality of parameter registers directly addressable by the RISC processor, the directly addressable registers enabling the SIMD instruction fetch unit to be tightly coupled to the RISC processor.

7. The parallel processor according to claim 6, wherein the SIMD controller comprises a Scalar Write Queue (SWQ) unit for receiving scalar data values calculated at run-time by the RISC processor, the Scalar Write Queue unit being tightly coupled to the RISC processor by provision of a dedicated SWQ register that indicates a status of a queue to the RISC processor.

8. The parallel processor according to claim 6, wherein the SIMD controller comprises a Scalar Read Queue (SRQ) unit for receiving scalar data values form all of outputs of enabled data processing units, the Scalar Read Queue unit being tightly coupled to the RISC processor by provision of a corresponding dedicated SRQ register that indicates status of a queue to the parallel processor.

9. The parallel processor according to claim 8, wherein the Scalar Read Queue unit is arranged to read an output of one data processing unit at a time and to construct read data into a scalar data item representing outputs of the enabled data processing units.

10. The parallel processor according to claim 6, wherein the SIMD controller comprises a Match Reply Latch (MRL) unit for capturing a match reply status of all connected processing units in parallel, the Match Reply Latch unit being tightly coupled to the RISC processor by provision of a dedicated MRL register that indicates a status of a match reply status capture to the parallel processor.

11. The parallel processor according to claim 1, when a single data processing unit among the plurality of data processing units has an active connection to an SIMD controller, the single data processing unit cannot connect to another SIMD controller unit until the active connection is relinquished.

12. The parallel processor according to claim 1, wherein the subgroup of actively connected data processing units selected from the plurality of data processing units is adjacent to another subgroup of actively connected data processing units selected from the plurality of data processing units.

13. The parallel processor according to claim 1, wherein data processing units among the plurality of data processing units not part of a subgroup with an active connection to an SIMD controller will be placed into a standby mode to reduce power consumption.

14. A parallel processor for processing a plurality of different processing instruction streams in parallel, the parallel processor comprising:
   a plurality of data processing units; and
   a plurality of Single Instruction Multiple Data (SIMD) controllers, wherein
      each SIMD controller among the plurality of SIMD controllers is not permanently connected to all of the plurality of data processing units but each SIMD controller among the plurality of SIMD controllers is permanently connected to only a group of data processing units of the plurality of data processing units, wherein the group of data processing units is less than the plurality of data processing units, and each SIMD controller among the plurality of SIMD controllers is further configured to handle an individual processing task with a subgroup of actively connected data processing units selected from the group of data processing units, and each SIMD controller among the plurality of SIMD controllers is configured to enable selection of the data processing units from the group of data processing units in accordance with instructions such that a size of the subgroup of data processing units can be varied dynamically under control of the instructions, thereby permitting each SIMD controller to be actively connected to a different number of data processing units for different processing tasks.

15. A parallel processor for processing a plurality of different processing instruction streams in parallel, the parallel processor comprising:
  a plurality of data processing units; and
  a plurality of Single Instruction Multiple Data (SIMD) controllers, wherein each SIMD controller comprises:
    a SIMD instruction fetch unit configured to fetch instructions from a memory external to the parallel processor;
    a SIMD decode unit configured to:
      decode the instructions fetched by the SIMD instruction fetch unit;
      enable selected data processing units in accordance with the instructions such that a size of the subgroup of data processing units to which each SIMD controller is actively connected can be varied dynamically under the control of the received instructions, thereby permitting each SIMD controller to be actively connected to a different number of the data processing units for different processing tasks; and
      forward micro-orders generated from the instructions to enable the data processing units selected from the group of data processing units in accordance with the instructions;
  the plurality of data processing units are connected together sequentially in a string formation;
  each SIMD controller is permanently connectable to only a group of data processing units of the plurality of data processing units, wherein the group of data processing units is less than the plurality of data processing units;
  each SIMD controller is configured to handle an individual processing task with a subgroup of actively connected data processing units selected from the group of data processing units; and
  the instructions define the sizes of the subgroups and the order in which the subgroups are to be configured from one end of the string formation of the plurality of processing units to an opposite end of the string formation.

* * * * *